United States Patent
Matsuo et al.

(10) Patent No.: US 7,424,182 B2
(45) Date of Patent: Sep. 9, 2008

(54) WAVELENGTH SELECTION SWITCH

(75) Inventors: Daisuke Matsuo, Hachioji (JP); Takuya Taniguchi, Mito (JP)

(73) Assignee: Olympus Corporation, Tokyo (JP)

( * ) Notice: Subject to any disclaimer, the term of this patent is extended or adjusted under 35 U.S.C. 154(b) by 5 days.

(21) Appl. No.: 11/642,800

(22) Filed: Dec. 20, 2006

(65) Prior Publication Data

US 2007/0147219 A1   Jun. 28, 2007

(30) Foreign Application Priority Data

Dec. 27, 2005   (JP) .............................. 2005-374322

(51) Int. Cl.
*G02B 6/28* (2006.01)
*G02B 26/02* (2006.01)
*G01J 3/28* (2006.01)

(52) U.S. Cl. .......................... 385/24; 359/572; 356/326
(58) Field of Classification Search .................. None
See application file for complete search history.

(56) References Cited

U.S. PATENT DOCUMENTS 6,657,770 B2   12/2003  Marom et al.

2004/0136074 A1*  7/2004  Ford et al. .................. 359/572
2004/0218177 A1* 11/2004  MacKinnon et al. ........ 356/326

FOREIGN PATENT DOCUMENTS

JP         2005-091910         4/2005

* cited by examiner

*Primary Examiner*—Tina M Wong
(74) *Attorney, Agent, or Firm*—Scully, Scott, Murphy & Presser, P.C.

(57) ABSTRACT

A wavelength selection switch includes a diffraction grating that spectrally separates entering light, a focusing optical system that receives the light spectrally separated by the diffraction grating and focuses the light at a predetermined position, a deflection member that is arranged at the predetermined position and includes deflection elements that deflect the light entering through the focusing optical system, a base on which the diffraction grating, the focusing optical system, and the deflection member are mounted, and a deflection member position adjusting member that adjusts a position of the deflection member with respect to one of the diffraction grating and the focusing optical system. The deflection member position adjustment member includes a positioning member that determines a reference position of the deflection member in a direction of spectral separation of the diffraction grating, and a guide member that guides the deflection member in the direction of spectral separation.

4 Claims, 4 Drawing Sheets

WAVELENGTH SELECTION SWITCH

CROSS-REFERENCE TO RELATED APPLICATIONS

This application is based upon and claims the benefit of priority from prior Japanese Patent Application No. 2005-374322, field Dec. 27, 2005, the entire contents of which are incorporated herein by reference.

BACKGROUND OF THE INVENTION

1. Field of the Invention

The present invention relates to a wavelength selection switch.

2. Description of the Related Art

Jpn. Pat. Appln. KOKAI Publication No. 2005-91910 discloses a wavelength selection switch. This wavelength selection switch comprises a grating that spectrally separates entering light, a focusing optical system that receives the light spectrally separated by the grating and focuses the light at a predetermined position, a MEMS module that is arranged at the predetermined position and deflects the light entering through the focusing optical system, and a base on which the grating and the focusing optical system are mounted. The wavelength selection switch is an optical switch that switches the transmission paths of a wavelength-multiplexed optical signal for each wavelength.

The respective optical components such as the MEMS module are arranged on the base at positions determined in design. More specifically, screw holes formed in the respective optical components are matched to holes formed in the base. After that, screws are inserted in the holes of the base and screwed into the screw holes of the optical components to fix the respective optical components to the base.

In the conventional wavelength selection switch, however, a manufacturing error of the grating, the aberration of the focusing optical system, and the like undesirably shift the optical position of the grating or the focusing optical system from that of the MEMS module. Then, the intensity of the output signal light attenuates.

As a method of solving this problem, the screws may be temporarily loosened, and the positions of the respective optical components may be adjusted. With this method, however, accurate adjustment is impossible.

BRIEF SUMMARY OF THE INVENTION

A wavelength selection switch comprises a diffraction grating that spectrally separates entering light, a focusing optical system that receives the light spectrally separated by the diffraction grating and focuses the light at a predetermined position, a deflection member that is arranged at the predetermined position and includes deflection elements that deflect the light entering through the focusing optical system, a base on which the diffraction grating, the focusing optical system, and the deflection member are mounted, and a deflection member position adjusting member that adjusts a position of the deflection member with respect to one of the diffraction grating and the focusing optical system. The deflection member position adjustment member includes a positioning member that determines a reference position of the deflection member in a direction of spectral separation of the diffraction grating, and a guide member that guides the deflection member in the direction of spectral separation.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The embodiments of the present invention will be described with reference to the accompanying drawing.

Figure 1:
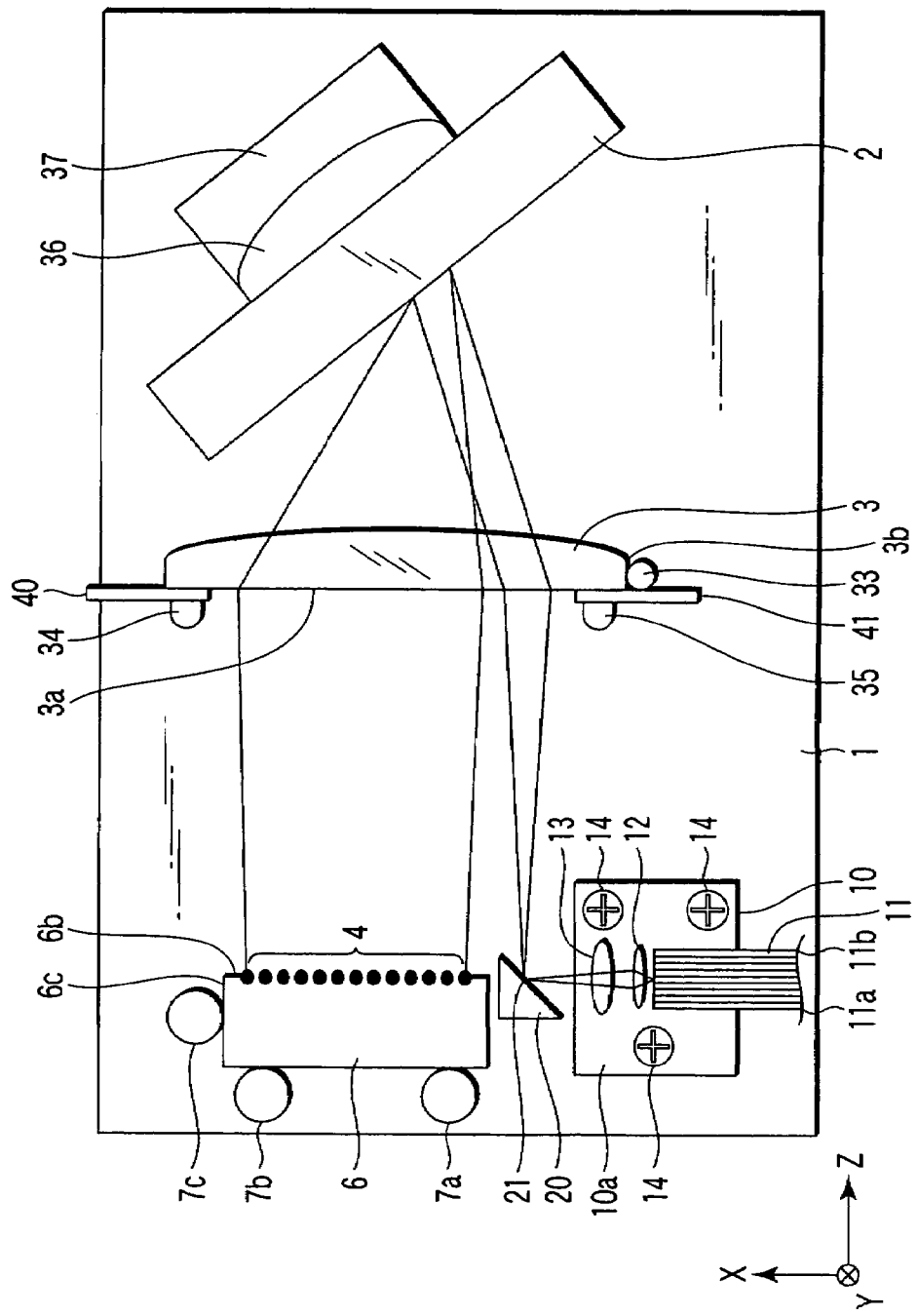
FIG. 1 is a plan view of a wavelength selection switch according to the first embodiment of the present invention.
Figure 2:
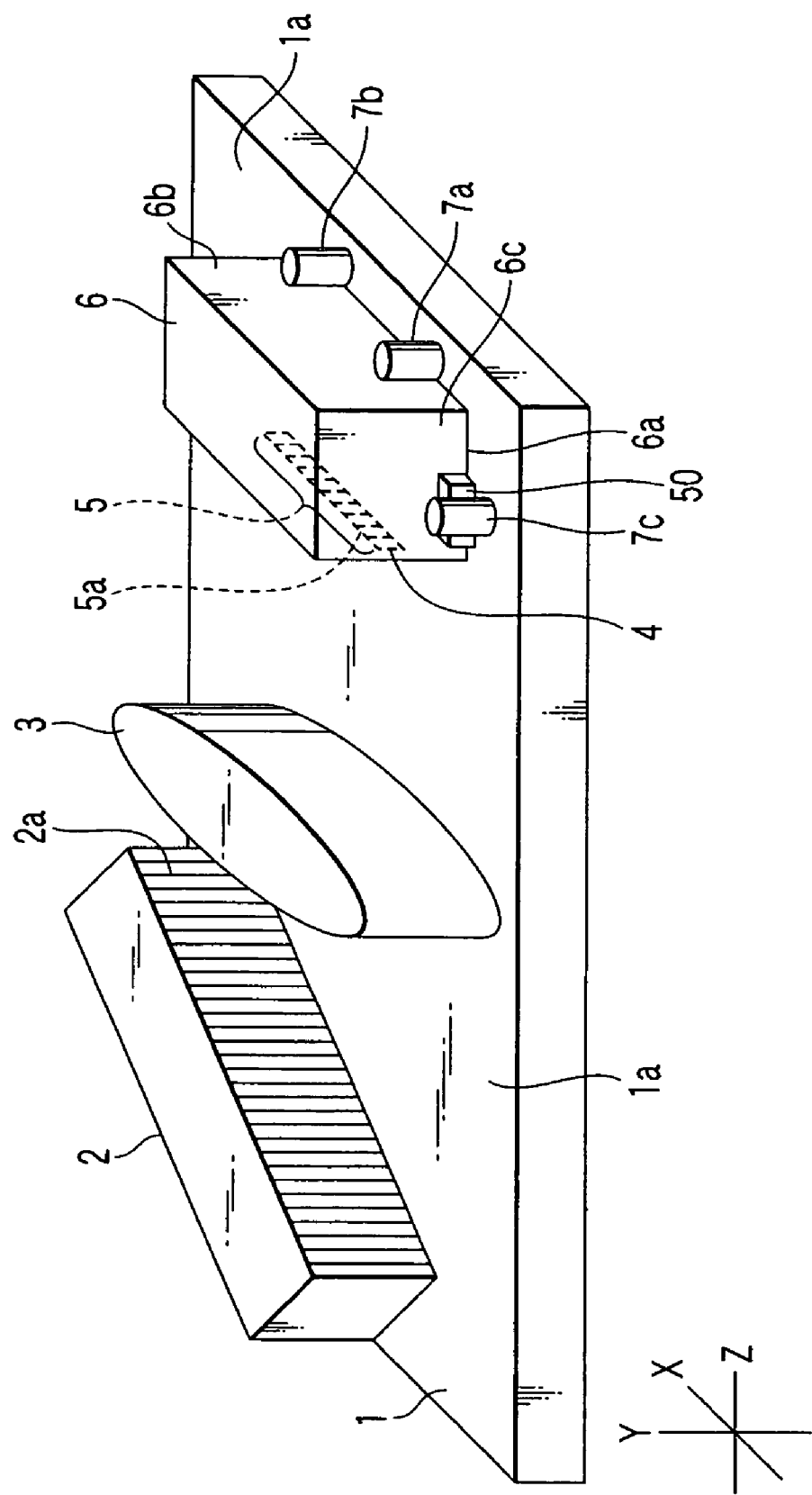
FIG. 2 is a view showing a state during the assembly of the wavelength selection switch.

FIG. 1 is a plan view of a wavelength selection switch according to the first embodiment of the present invention, and FIG. 2 is a view showing a state during the assembly of the wavelength selection switch. The positions of the components of the wavelength selection switch in FIG. 2 are different from those of the components in FIG. 1.

Referring to FIG. 1, the Z-axis represents the direction of optical axis of a Littrow lens 3. The X-axis represents the direction along which focal points 4 of beams obtained by spectral separation of a grating (diffraction grating) 2 line up, i.e., the direction of spectral separation. The Y-axis is an axis perpendicular to the X- and Z-axes.

The wavelength selection switch comprises a fiber module 10, a mirror 20, the Littrow lens 3, the grating 2, a MEMS module (deflection member) 6, and a base 1.

The fiber module 10 includes a fiber array 11, a microlens array 12, a focusing lens 13, and a plate 10a on which the fiber array 11, the microlens array 12, and the focusing lens 13 are mounted.

The fiber module 10 is fixed on the base 1 by bolts 14 threadably engaging with screw holes (not shown) formed in the base 1 through bolt insertion holes (not shown) formed in the plate 10a. The diameters of the bolt insertion holes are much larger than the diameters of the trunks of the bolts 14. This allows adjustment of the position of the plate 10a on the base 1 in the X and Z directions.

The microlens array 12 receives light entering from a first light transmission path 11a of the fiber array 11 and collimates it.

The focusing lens 13 focuses the light collimated by the microlens array 12 at a point near the mirror 20. For example, the mirror 20 is fixed on the base 1 with an adhesive.

The Littrow lens 3 receives the light from the mirror 20, collimates it, and guides it to the grating 2. The grating 2 spectrally separates the light reflected by the mirror 20 and having multi-wavelength components in the spectral separation direction (X-axis direction) in the form of band-like beams. The Littrow lens 3 constitutes a focusing optical system that receives each beam obtained by spectral separation by the grating 2 to form the image of the output end face of the first light transmission path 11a at a predetermined position.

The Littrow lens 3 is positioned in the Z direction by changing the thicknesses of plates 40 and 41 sandwiched between the Littrow lens 3 and pins 34 and 35 that vertically stand on the base 1. After positioning, the Littrow lens 3 is fixed to the base 1 with, e.g., an adhesive. The base 1 is provided with a pin 33 that abuts against a side surface 3b of the Littrow lens 3 to prevent shift of the Littrow lens 3 in the direction of spectral separation during adhesion.

The grating 2 is an optical element with a grating structure having 200 to 3,000 narrow equidistant slits or grooves per 1 mm. The positioning mechanism for the grating 2 comprises a projecting surface portion 36 and a support member 37. The hemicylindrical projecting surface portion 36 is fixed on the rear surface of the grating 2. The projecting surface portion 36 is supported by the support member 37 fixed on the base 1 so as to be allowed to rotate about the Y-axis. Grooves 2a of the grating 2 are perpendicular to the upper surface 1a of the base 1.

After adjusting the position of the grating 2, the projecting surface portion 36 is fixed to the support member 37 using an adhesive or a screw.

The MEMS module 6 has a MEMS mirror array 5 to correspond to the wavelengths of the band-like beams that are obtained by spectral separation by the Littrow lens 3 and the grating 2. The arrangement of the MEMS module 6 is shown in FIG. 4.

Figure 4:
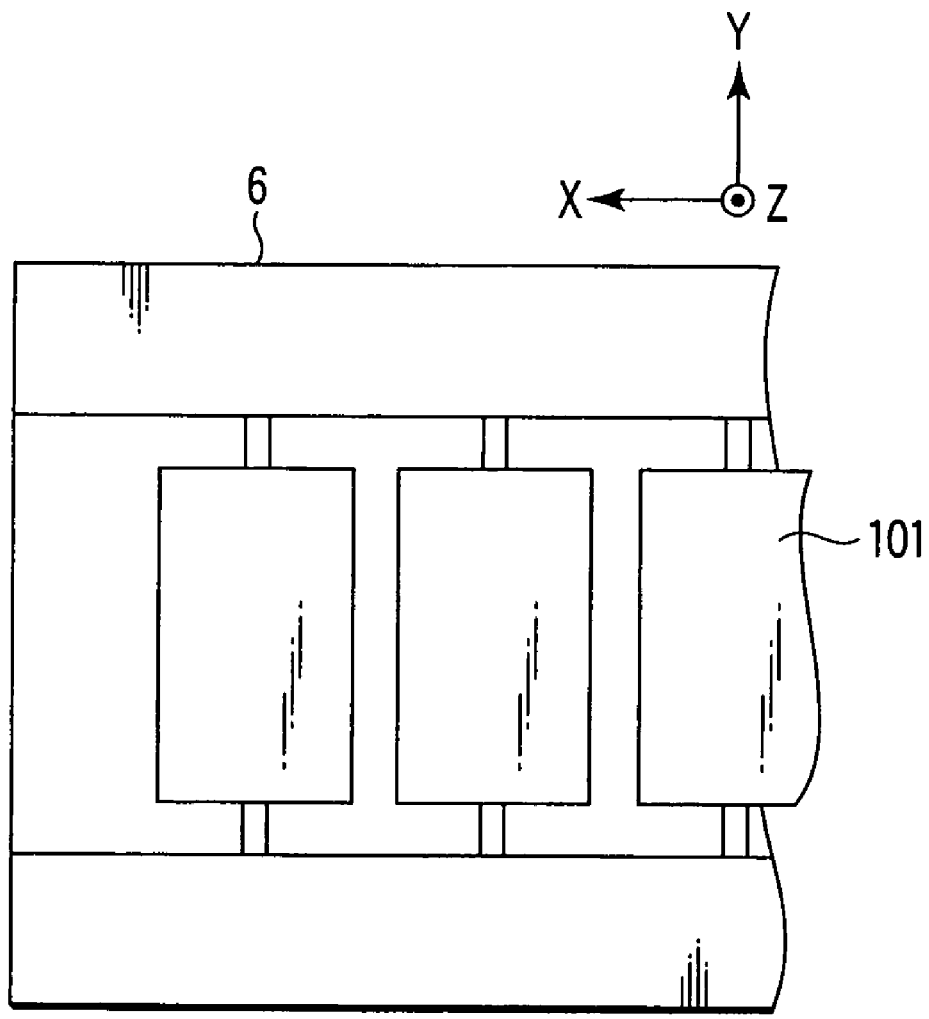
FIG. 4 is an enlarged view of a MEMS module.

FIG. 4 is an enlarged view of the MEMS module 6.

The MEMS mirror array 5 includes mirrors (deflection elements) arranged in an array. The mirrors 101 each have a rectangular shape extending parallel to the direction of grooves of the grating 2, and are allowed to rotate about the Y-axis. By changing the rotational angles of the mirrors 101, the mirrors 101 reflect the received light to enter a desired fiber of the fiber array 11. The MEMS module 6 has a vertical surface 6b that is perpendicular to the upper surface 1a of the base 1 and parallel to the direction of spectral separation (X-axis direction), an attaching surface 6a that is in contact with the upper surface 1a of the base 1 and parallel to the upper surface 1a of the base 1, and a side surface 6c that is perpendicular to the vertical surface 6b and the attaching surface 6a. Mirrors 5a are rotatable about axes parallel to the grooves 2a of the grating 2. The mirrors 5a each have rectangular shapes extending parallel to the grooves 2a of the grating 2.

Pins (guide members) 7a and 7b and a pin 7c to position the MEMS module 6 are provided on the upper surface 1a of the base 1. The pins 7a and 7b vertically stand on the upper surface 1a of the base 1 to line up along the direction of spectral separation. The pin 7c vertically stands on the upper surface 1a of the base 1 and determines the reference position of the MEMS module 6 in the direction of spectral separation. The pins 7a, 7b, and 7c constitute a deflection member position adjusting member. As the guide members, pieces may be employed in place of the pins 7a and 7b, or a plate-like projection (not shown) may be integrally formed on the upper surface 1a of the base 1. In place of the pin 7c, a piece may be employed, or a plate-like projection may be integrally formed on the upper surface 1a of the base 1. The piece is an eccentric washer or a plate-like member having an elongated hole. The piece is fixed to the upper surface 1a of the base 1 by a screw or an adhesive. The MEMS module 6 is brought into contact with the piece to position it.

Light having multi-wavelength components that emerges from the first light transmission path 11a of the fiber array 11 focuses at a focal point 21 and is reflected by the mirror 20.

Light from the mirror 20 is transmitted through the Littrow lens 3 and reflected by the grating 2. Light reflected by the grating 2 is transmitted through the Littrow lens 3 and enters the MEMS mirror array 5 of the MEMS module 6. At this time, the beams of the respective wavelengths focus at the focal points 4 and are condensed at the centers of the corresponding mirrors 5a of the MEMS mirror array 5. Light reflected by the MEMS mirror array 5 of the MEMS module 6 is collimated through the Littrow lens 3 and spectrally separated by the grating 2 such that beams traveling toward a second light transmission path 11b are demultiplexed. Light spectrally separated by the grating 2 is condensed through the Littrow lens 3, focuses at the focal point 21, and is reflected by the focal point 21. Light then enters the emerging-side end face of the second light transmission path 11b of the fiber array 11 through the focusing lens 13 and the microlens array 12.

When assembling the wavelength selection switch, the following adjustment is performed.

To match the focal point of the Littrow lens 3 at the mirrors 5a of the MEMS mirror array 5, at least one of position adjustment of the MEMS mirror array 5 in the Z-axis direction, position adjustment of the Littrow lens 3 in the Z direction, and position adjustment of the fiber module 10 in the direction of spectral separation must be performed. To adjust the heights of the focal points 4 in the Y-axis direction, the position of the fiber module 10 in the Y direction is adjusted.

To position the MEMS module 6 in the direction of spectral separation, a plate 50 is sandwiched between the pin 7c and the side surface 6c of the MEMS module 6. At this time, the MEMS module 6 is moved in the direction of spectral separation along the pins 7a and 7b. The plate 50 and the pin 7c constitute a positioning member. The MEMS module 6 may be positioned in the direction of spectral direction by an adhesive or a screw after it is moved by using a microstage or a microhead to a position where the optical characteristics become optimal. In this case, the machining accuracy of the plate 50 and the positioning accuracy of the pin 7c are moderated.

As a result, each MEMS mirror reflects light within a predetermined wavelength range without diversion. This suppresses attenuation of the intensity of signal light to be output.

This embodiment exemplifies a case of adjusting the position of the MEMS module 6. The pins 7a, 7b, and 7c are used not only when adjusting the position of the MEMS module 6 but also when exchanging the MEMS module 6. For example, when the MEMS module 6 fails due to some reason, it must be exchanged. If the distance from the pin 7c to each MEMS mirror of the MEMS module 6 that has been position-adjusted is measured in advance, a new MEMS module 6 is readily positioned by setting the distance in the direction of spectral separation to each MEMS mirror of the new MEMS module 6 to be exchanged to the distance measured in advance. In this case, the new MEMS module 6 may be positioned by removing the plate 50.

The tolerance of the position accuracy (shift) of the MEMS mirror array 5 will be described. The tolerance of the value of apparent reciprocal linear dispersion (wavelength/image width) is preferably ±0.1%. When the image width is about 28 mm, a tolerance of a maximum of 28×0.001=28 μm (about 30 μm) is allowed as the shift. At the two ends of the image, a tolerance of a maximum of about 15 μm is allowed on each side. Considering the above result, the position accuracy (shift) of the MEMS mirror array 5 is about 5 μm to 15 μm (about ⅓ to 1 time the allowable amount).

After positioning, the MEMS module 6 is directly fixed to the base 1 with, e.g., an adhesive. Alternatively, the MEMS module 6 may be fixed to the base 1 by screws (not shown).

According to this embodiment, the MEMS module 6 is highly accurately positioned in the direction of spectral separation only by changing the plate 50. The respective mirrors 5a of the MEMS mirror array 5 form rectangles extending parallel to the grooves 2a of the grating 2. Thus, the spectrally separated light has a wide radiation range, and the adjustment accuracy in the Y-axis direction in FIG. 2 is moderate, which is preferable. The mirrors 5a of the MEMS mirror array 5 are rotatable about the axes parallel to the grooves 2a of the grating 2. This facilitates the manufacture of the MEMS mirror array 5. For example, when the mirrors 5a of the MEMS mirror array 5 are rotatable about axes perpendicular to the grooves 2a of the grating 2, springs must be attached to the four corners of each mirror 5a to hang it, or a hinge must be attached to the lower end of each mirror 5a to provide a cantilevered hinge structure. In contrast to this, when the mirrors 5a of the MEMS mirror array 5 are rotatable about the axes parallel to the grooves 2a of the grating 2, only hinges need be attached to the centers of the respective mirrors 5a. The upper surface 1a of the base 1 allows positioning in the Y-axis direction. This facilitates positioning in the Y-axis direction. The pins 7a and 7b allow positioning in the Z-axis direction. This facilitates positioning in the Z-axis direction.

The position of the MEMS module 6 in the Z direction is determined by the pins 7a and 7b, as described above, but may be adjusted by preparing plates different in thickness in advance, selecting a plate having a suitable thickness from the plates, and inserting the selected plate between the pins 7a and 7b and the vertical surface 6b of the MEMS module 6.

Figure 3:
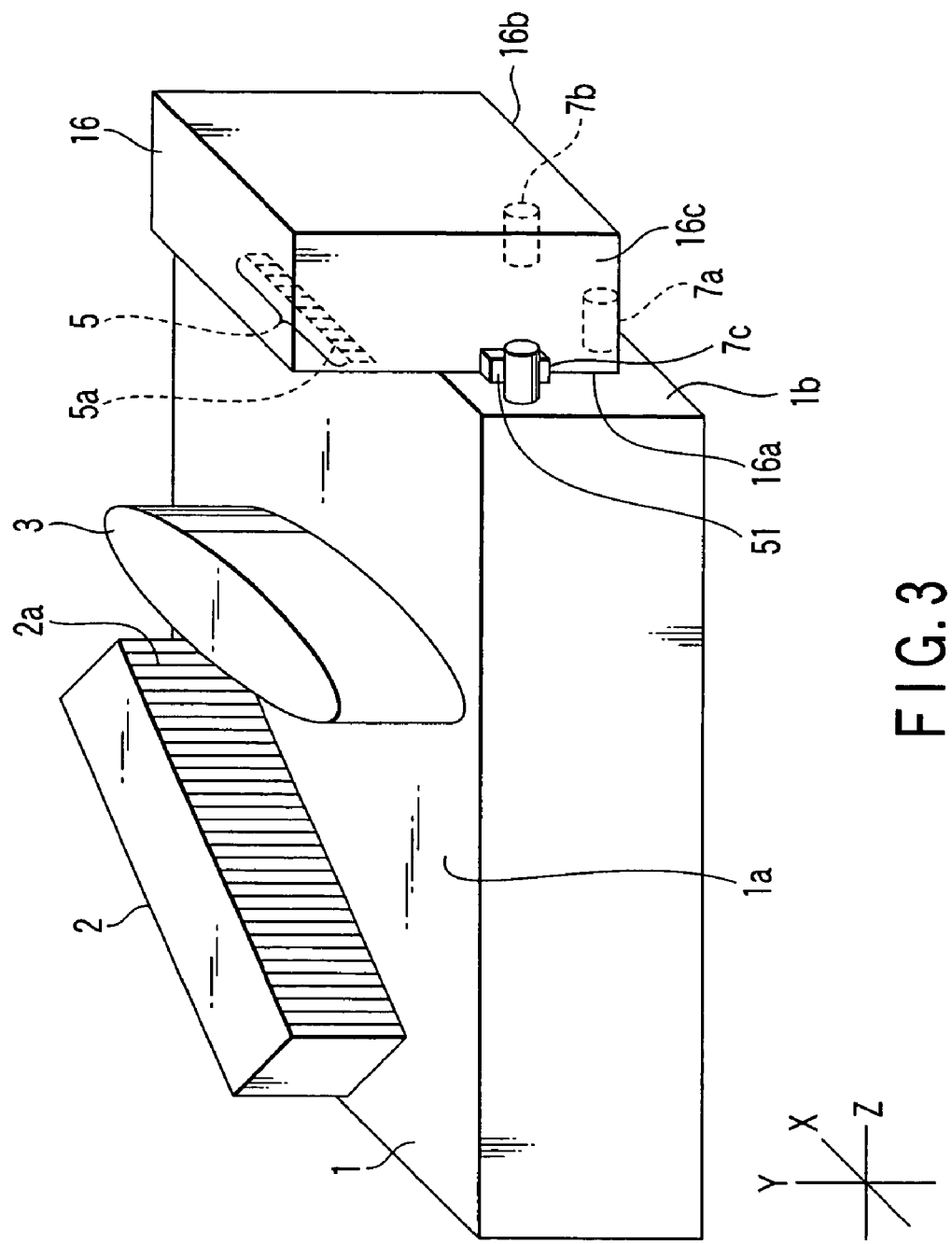
FIG. 3 is a view showing a state during the assembly of a wavelength selection switch according to the second embodiment of the present invention.

FIG. 3 is a view showing a state during the assembly of a wavelength selection switch according to the second embodiment of the present invention. Portions that are common to the first embodiment are denoted by the same reference numerals, and a description thereof will be omitted.

This embodiment is different from the first embodiment in that the MEMS module 16 is arranged on a side surface 1b of a base 1.

According to this embodiment, the MEMS module 16 has an attaching surface 16a that is in contact with the side surface 1b of the base 1 and parallel to the side surface 1b of the base 1, a vertical surface 16b that is perpendicular to the side surface 1b of the base 1 and parallel to the direction of spectral separation (X-axis direction), and a side surface 16c that is perpendicular to the vertical surface 16b and the attaching surface 16a.

The side surface 1b of the base 1 is provided with the pins 7a and 7b (guide members) and a pin 7c (positioning member) to position the MEMS module 16. The pins 7a and 7b vertically stand on the side surface 1b of the base 1 to line up along the direction of spectral separation. The pin 7c vertically stands on the side surface 1b of the base 1 and determines the reference position of the MEMS module 16 in the direction of spectral separation. The pins 7a, 7b, and 7c constitute a deflection member position adjusting member.

The MEMS module 16 is positioned in the direction of spectral direction by changing the thickness of a plate 51 to sandwich between the pin 7c and the side surface 16c of the MEMS module 16. At this time, the MEMS module 16 is moved in the direction of spectral separation along the pins 7a and 7b.

This embodiment provides the same effect as that of the first embodiment, but the MEMS module 16 is positioned in the Y-axis direction by the pins 7a and 7b and in the Z-axis direction by the side surface 1b of the base 1.

In the embodiments described above, the pin 7c that is fixed to the base 1 as the positioning member and the plate 50 or 51 that is appropriately selected from plates having different thicknesses are employed. The plate 50 or 51 is inserted between the pin 7c and the side surface 6c of the MEMS module 6 or the side surface 16c of the MEMS module 16, and the position of the MEMS module 6 or 16 is adjusted in the direction of spectral direction. In place of this method, as the positioning member, a pin that is appropriately selected from pins (not shown) that are detachable from the base 1 and have different diameters may be employed. The selected pin may be mounted on the base 1 to adjust the position of the MEMS module 6 or 16 in the direction of spectral separation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wavelength selection switch comprising:
a diffraction grating that spectrally separates entering light;
a focusing optical system that receives band-like beams spectrally separated from the light by the diffraction grating and focuses each of the band-like beams at predetermined positions;
a deflection member that is arranged at the predetermined position and includes deflection elements that respectively deflect the spectrally separated band-like beams entering through the focusing optical system;
a base on which the diffraction grating, the focusing optical system, and the deflection member are mounted; and
a deflection member position adjusting member that is mounted on the base and adjusts a position of the deflection member with respect to one of the diffraction grating and the focusing optical system when adjusting assembly of the wavelength selection switch, the deflection member position adjustment member including a positioning member that determines a reference position of the deflection member in a direction of spectral separation, the direction being where focal points of band-like beams spectrally separated by the diffraction grating are lined up, and a guide member that enables the deflection member to move along in the direction of spectral separation, the deflection member position adjustment member positions the spectrally separated band-like beams respectively on the deflection elements by moving the deflection member along the guide member and positioning the deflection member by a positioning member to where the optical characteristics of the reflection light from deflection elements become optimal.

2. A switch according to claim 1, wherein the diffraction grating, the focusing optical system and the deflection member are provided on an upper surface of the base and the positioning member and the guide member, which are the deflection member position adjustment member, are provided on the upper surface of the base.

3. A switch according to claim 2, wherein the upper surface of the base is perpendicular to grooves of the diffraction grating, and the deflection member includes a vertical surface that is perpendicular to the upper surface of the base and parallel to the direction of spectral separation, an attaching surface that is in contact with the upper surface of the base and parallel to the upper surface of the base, and a side surface that is perpendicular to the vertical surface and the attaching surface.

4. A switch according to claim 3, wherein the guide member to abut against a vertical surface of the deflection member is selected from pins or pieces provided on the upper surface of the base, or a plate-like projection integrally formed on the upper surface of the base.

* * * * *